United States Patent [19]

Cromer

[11] Patent Number: 4,598,694
[45] Date of Patent: Jul. 8, 1986

[54] WATER HEATER PARTITION AND METHOD

[76] Inventor: Charles J. Cromer, 460 Indian Creek Dr., Cocoa Beach, Fla. 32931

[21] Appl. No.: 689,727

[22] Filed: Jan. 8, 1985

[51] Int. Cl.4 .............................................. F24H 9/14
[52] U.S. Cl. ................................. 126/361; 122/13 R; 122/13 A; 126/437; 126/362; 219/314
[58] Field of Search .................. 122/13; 126/361, 362; 219/314

[56] References Cited

U.S. PATENT DOCUMENTS

| | | | |
|---|---|---|---|
| 243,680 | 7/1881 | Austin | 126/362 |
| 719,820 | 2/1903 | Leigh | 141/331 |
| 1,728,097 | 9/1929 | Besson | 219/314 X |
| 2,544,927 | 3/1951 | Knapp | 122/13 |
| 2,561,465 | 7/1951 | Epling et al. | 122/17 |
| 2,643,322 | 6/1953 | Lime et al. | 219/38 |
| 2,644,432 | 7/1953 | Hummel | 122/13 |
| 2,804,534 | 8/1957 | Coates | 219/314 |
| 3,066,214 | 11/1962 | Arnold | 219/314 |
| 4,037,785 | 7/1977 | Madern | 126/437 X |
| 4,253,446 | 3/1981 | Müller | 126/435 |

*Primary Examiner*—James C. Yeung
*Assistant Examiner*—Allen J. Flanigan
*Attorney, Agent, or Firm*—William M. Hobby, III

[57] ABSTRACT

A water heater storage reservoir partition is shaped to provide increased thermal stratification in the tank. A generally circular partition member has a central opening therein and a wedge shape portion removed therefrom so that the circular flat partition member can be folded into a cone for attaching into a water heater tank and especially into a solar heater tank provided with solar heated water. The peripheral edge of the partition member has removed portions therefrom so that falling cooler water is allowed to pass along the tank walls through the plurality of removed portions in the edge of the water heater partition. The hot water is stratified towards the middle of the tank while cooler water passes along the walls of the tank and accumlates in the bottom of the tank. A screen may be placed in the center opening of the partition. One or more holes may be provided within the partition for the sacrifical anode or a water pipe. A method of making a water heater includes making a flat partition member for a hot water tank having a circumference larger than the circular interior walls of the hot water tank and having a central opening therethrough and a wedge shaped portion removed therefrom, then bending the selected partition member to a generally truncated cone shape and inserting the truncated cone shape into the water heater tank in a predetermined position. The method also includes inserting a screen into the central opening of the partition member.

8 Claims, 6 Drawing Figures

WATER HEATER PARTITION AND METHOD

BACKGROUND OF THE INVENTION

The present invention relates to domestic water heaters and especially to a partitioning water heater tank member for stratifying the water in the tank in a predetermined pattern.

Domestic water heaters have been used for many years, and generally are composed of a tank connected to a cold water inlet by a tube to the bottom of the tank and a hot water outlet connected to the top of the tank. One or two heating elements are disposed in the tank for heating the water contained therein. The lower heating element provides the majority of the heating responsive to the lower thermostat, while the upper element responds to a thermostat located in the upper one-third of the tank and provides a quick recovery of heated water when most of the hot water in the tank has been drawn off. The response time in heating the top portion of the tank and thus providing renewed hot water is extended in the typical tank design because of the induced mixing of the heated water rising off of the heating element with the water below the element drawn up in a circular pattern. Prior patents dealing with thermal stratification may be seen in U.S. Pat. No. 4,253,446 to B. Muller, which divides a solar storage reservoir between the solar collected energy and the auxiliary heater with an opening pipe directly under the auxiliary heater. A Patent to R. G. Fleet, U.S. Pat. No.: 3,546,429, also provides thermal stratification of the water in the tank. A Patent to H. E. Thomason, U.S. Pat. No.: 4,369,764, shows a first hot water heater inside a second hot water used in conjunction with a solar heater. A Patent to J. W. Andrews, U.S. Pat. No.: 4,390,008, has a sliding disk mounted in a hot water heater for partially dividing a hot water tank, while U.S. Pat. No.: 4,357,932 to W. Dodd Stacy has a fixed divider in a solar heating system. These devices have the disadvantage of causing an internal circulation within the tank whenever the hot water rising from the heating element is not drawn out of the top port so that the mixing or destratification has the net effect of greater heat loss from the tank than would be the case in a well stratified tank. Greater heat loss occurs along the walls of the tank so that maintaining cooler water stratified adjacent the walls minimizes the loss through the heater walls. Thermal stratification has increased significance when a tank and back up heating element are coupled to a solar heating system.

Single tank solar water heating systems are generally classified as direct or indirect. Those that utilize a non-freezing circulation fluid, to collect heat when passing through the collector and then add heat to the storage tank when passed through a heat exchanger, located within the storage tank are referred to as indirect systems. Systems that circulate the tank potable water directly through the solar panel are referred to as direct systems. In a single tank solar system, the lower element is replaced with a heat exchange coil in the indirect system while the direct system allows direct circulation of water to the solar absorber. These existing tank configurations have the disadvantage that the circulation of a direct connected solar system mixes the temperature of gradients within the solar tank, reducing the efficiency of the collector system. Such mixing is also induced by the hot water rising from a solar heat exchanger of the indirect type. Prior U.S. Pat. No.: 4,253,446 utilizes a separating wall with two flow orifices, one of which utilizes a tube to direct rising or falling water with the intent of enhancement of thermal stratification within the tank. This Patent has the disadvantage of enhancing the natural circulation throughout the entire tank caused by the backup element. Colder water from the lower tank section is drawn up through the orifice adjacent the back up element to replace the heated water rising from the element. This in turn draws down water through the second orifice and tube, thereby mixing the water in the tank in a circulating fashion. The drawn down water is usually warmer than the temperature of the existing water in the bottom of the tank, and this mixing defeats the stratification of the tank divider.

An aim of the present invention is to construct a baffle of such design that it may be readily inserted into a hot water tank during its manufacture to produce stratification by naturally rising hotter water directed towards the center of the tank where it is insulated by the cooler water near the tank walls. Any cooler naturally falling water is directed towards the tank wall where it can insulate the hotter water stratified towards the center of the tank. Lateral mixing motion is induced by the solar circulation pump or water being drawn from the tank top with colder replacement water entering the bottom, or by the heating element cycling on it's thermostat. This invention prohibits the mixing of the entire tank and disrupting whatever thermal stratification exist. Such mixing is limited to the area of the tank enclosed by the tank walls and the partition placed therein. A divider properly placed below the upper heating element of the tank prohibits the circulation throughout the tank caused by the heating elements cycling and thus provides a more rapid recovery of heated water available for use than would be otherwise experienced in a tank of typical construction.

SUMMARY OF THE INVENTION

A water heater partition includes a generally flat circular partition member having a central opening therethrough and a removed generally wedge shaped portion removed therefrom between the outer peripheral and the central opening, whereby the partition can be folded to form a truncated cone shape for insertion into a water heater. The flat partition member may have one or more additional openings therethrough for a cold water pipe or a sacrificial anode rod. A screen insert may be used to cover the central opening. The flat partition member may also have a plurality of edge portions around the peripheral thereof removed so that when inserted into a hot water heater with the peripheral adjacent the tank wall of the hot water heater tank, water can circulate past the partition along the walls. The water heater partition may be made of an insulating material.

A method of making a water heater includes the step of making a circular flat partition for a water tank having a circumference larger than the interior walls of a water heater tank and a central opening therethrough and wedge shaped portion removed therefrom. The partition member is bent to form a generally truncated cone shape and inserted into a water heater tank at a predetermined position below the upper heating element of the water heater, so that rising heated water is fed to the middle of the tank through the cone center opening and falling cooler water is directed along the edge of the tank. The making of the partition may include forming of a partition member with a plurality of removed portions around the peripheral of the partition. The method may also include the steps of attaching overlapping edges formed by bending the partition into a cone shape with the edges of the removed wedge shape portion overlapping and attaching a screen to cover the central opening in the partition.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
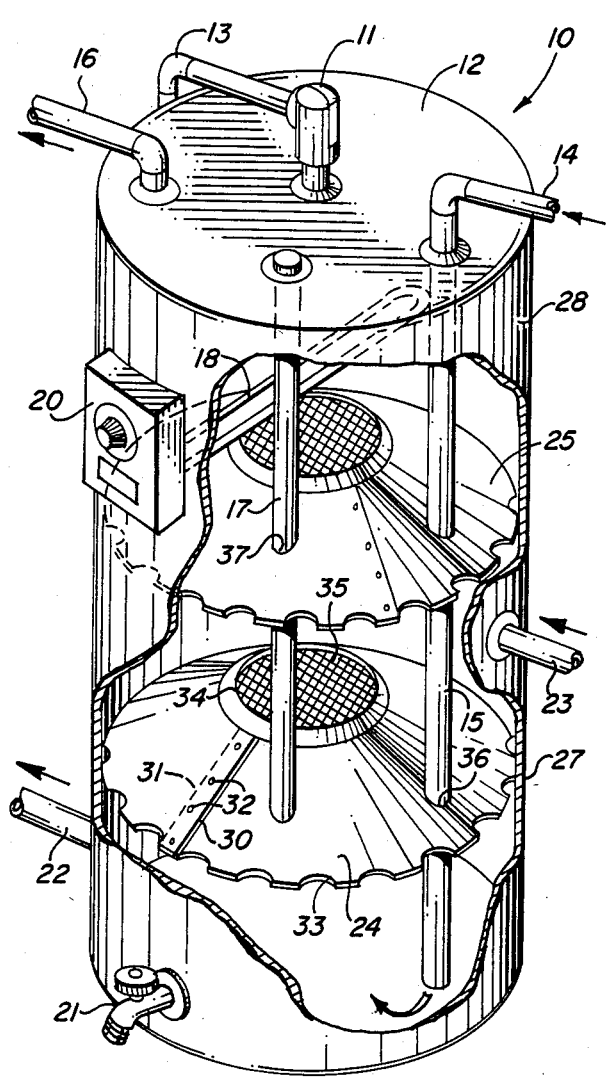
FIG. 1 is a cutaway prospective view of a water heater having a pair of tank partitions in accordance with the present invention.

Referring to the drawings, a hot water tank 10 in FIG. 1 is for use with a solar collector. The hot water tank 10 is a conventional domestic hot water heater having a pressure relief valve 11 connected to the top 12 thereof and having a pipe 13 to drain off any liquid from the pressure relief valve. If the pressure relief valve is actuated, cold water enters the water heater 10 through a pipe 14 and passes through the pipe 15 to the bottom of the water heater 10. Hot water in turn leaves the hot water heater through the hot water pipe 16 connected through the top 12. A magnesium anode rod 17 is connected to the top 12 and extends into the water heater 15. The heating element 18 is connected to a thermostat 20 on the side of the hot water heater 10 and regulates the heat of the water in the top portion of the water tank 10. The tank has a drain 21 for draining the water heater 10. The present hot water heater has been adapted for use with a solar collector and has a pipe 22, which connects to the solar collector and directs cold water from the hot water tank 10 to the collector which may typically be placed on the roof of a building through the hot water collector and back to the hot water tank 10 through the return pipe 23. A collector pipe 22 is connected to the bottom of the tank 10 while the pipe 23 returning from the solar collector with heated water is connected to an upper portion of the tank 10 so that the water in the tank is stratified to some degree with the cold water towards the bottom and the hot water towards the top of the tank. A pair of hot water tank partitioning members 24 and 25 are placed in the tank to partition the cold water in the bottom portion of the tank 26 from the warmer water being received from the collector in the middle portion of the tank 27, and the middle portion is partitioned by the partition member 25 from the hot water in the upper portion of the tank 28.

The partition members 24 and 25 have each been cut from a flat piece of material in a manner that when folded with their edges 30 and 31 pulled together and attached with rivets 32, or the like, the partition member forms a truncated cone shape from the flat member. Each partition member also has a plurality of removed portions 33. Which may be small semi-circular shaped openings to allow the passage of cool water along the walls of the tank 10, as the cool water moves towards the bottom of the tank. The cone shaped partition 24 is shaped to exactly fit within the tank 10 so that warm rising water from the bottom of the tank is directed by the cone shape into the middle of the tank 10 and through an opening 34 in the middle of the partition member. The opening 34 may have a screen 35 placed therein. The partition member also may have an opening 36 for the passage of a cold water supply line, even though some water heaters will bring the water supply into the bottom of the tank, and would thus not require the opening 36, as shown in partition member 35. The partition members may also have a second opening 37 for the passage of an anode rod 17.

In operation, one or two partitioning members 24 and 25 are placed in a hot water heater 10 to help stratify the cold water on the bottom of the tank from the hot water in the top of the tank, and to direct rising warm water from the solar collector or from a first heating element into the cone shaped partition 24 or 25 where it is directed towards the center of the tank, thereby stratifying the water in the tank near the top of the tank, and in the middle of the tank and forcing cooler water to be pushed downwards along the edges of the tank and passed through the openings 33 along the edge of the partitions 24 and 25. This results in reduced heat loss through the walls of the hot water tank, and thus a savings in energy. The hottest water is in the top center portion of the tank, where it is drawn off through the hot water line 16. Normally the solar collector or the lower heating element provides the heated water while the upper heating element is for quick recovery upon the rapid draw down of the heated water.

Figure 2:
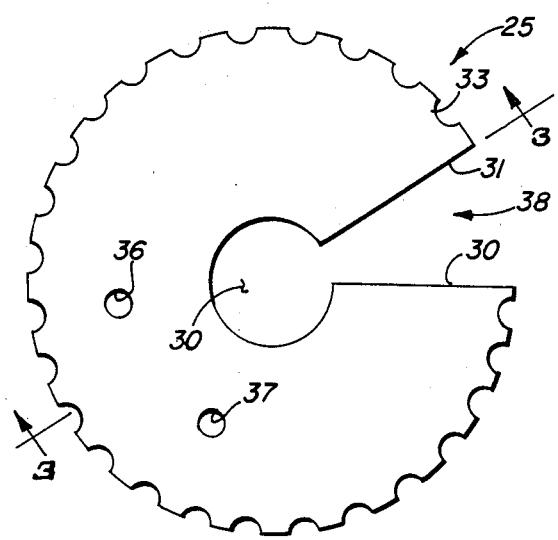
FIG. 2 is a top plan view of a water heater partition in accordance with the present invention.
Figure 3:
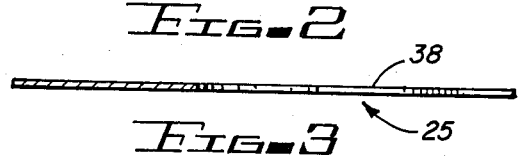
FIG. 3 is an edge elevation of the partition of FIG. 2.
Figure 4:
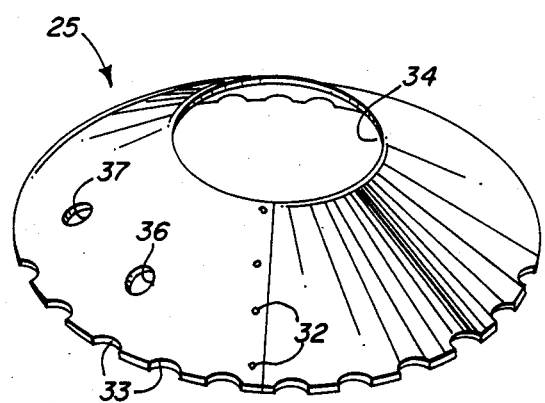
FIG. 4 is a prespective view of the partition of FIGS. 2 and 3 formed into a truncated cone shape for insertion into a tank.

FIGS. 2 and 3 show the partitioning element 25 as a flat piece of material which can be metal or an insulating polymer material if desired. The flat sheet of material of FIGS. 2 and 3 is generally circular in shape having a plurality of removed portions 33 and a center opening 34 and a wedge shaped portion 38 removed from the peripheray of the partition 25 to the center opening 34 so that when the flat sheet is folded to bring the edges 30 and 31 together to overlap, a truncated cone shape is formed as shown in FIG. 4. The edges 30 and 31 may be rivited together with rivets 32 or otherwise attached together to hold the cone shape. The flat sheet has openings 36 and 37 therein for the passage of tubes within the water heater.

Figure 5:
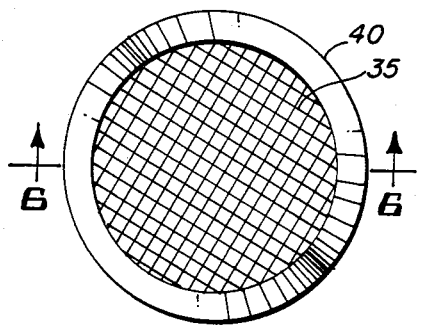
FIG. 5 is a top plan view of a screen insert for the center portion of the partition of FIG. 4.
Figure 6:
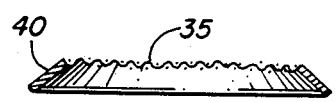
FIG. 6 is a sectional view taken on line 6—6 of FIG. 5.

The shape as shown in FIG. 4 is a truncated cone having the center opening 34, and removed edge portions 33 to form passageways with the internal wall of the water heater 10 when placed therein. FIGS. 5 and 6 show the buffer screen 35 which may be placed in the opening 34 and may have an annular angled sides 40 for fitting into the bottom of the partition 25 where it can be attached with clips or bolts, or otherwise.

It should be clear at this point that a water heater, for use in solar collectors or residential hot water heaters, has been provided with a water partition and stratification member for stratifying the water in the tank between the hot water and the cold water, directing the hot water toward the center upper portion of the tank, and the cold water to the bottom portion of the tank.

The partition of FIGS. 1 through 6 are made by forming a flat sheet of material into the partition member 25 as shown in FIG. 2, which may typically be formed by stamping or die cutting a flat sheet of material to form the shape as shown in FIGS. 2 and 3. The flat sheet is stamped in a generally circular shape with a center opening 34 and a wedge shape space 38 connecting the periphery of the partition to the center opening 34. The removed portions 33 may also be stamped at the same time and may be of different shapes and sizes as desired. One or two openings 36 and 37 may be stamped into the flat member. The flat member is then folded into a truncated cone shape to bring the edges 30 and 31 together to form a truncated cone shape partition member attaching the edges together as shown in FIG. 4. The partition member 25 is then inserted into a water tank 10 in a predetermined position, where it can be held by a pressure fit in the tank. The flat material portion in FIG. 2 is cut to a size slightly larger than the interior of the water tank 10 so that when folded as shown in FIG. 4, it has a smaller perimeter, but still one which can be pressure fitted into the tank. The process includes cutting and forming a screen, as shown in FIGS. 5 and 6 to cover the opening 34 in the partition member 35. The screen can be attached or formed when the partition member 25 is assembled or formed or can be added to the tank at a later time to form a completed hot water tank partition. The process of making and attaching the hot water tank partition in accordance with the present invention, allows for an inexpensive partition producing a more effective stratification in the hot water tank.

It should be clear that both the process of making a hot water tank, having a partition member for stratifying water therein, as well the partition member, have been provided. It should, however, be clear that the present invention is not to be construed as limited to the forms shown, which are to be considered illustrative rather than restricted.

I claim:

1. A water heater partition member comprising:
a generally circular flat partition member having a peripheral edge and a central opening therethrough, with a generally wedge shaped gap therein between the outer periphery and the central opening in said flat partition member; said partition member having at least one aperture therein, and said flat partition member being bent to form a generally truncated cone shape having the edge portions along the wedge shaped gap attached together and having a screen member thereto covering said flat partition member central opening.

2. A water heater partition member in accordance with claim 1 in which said partition member has a plurality of removed portions formed in the periphery thereof whereby the passage of cool water is allowed along the walls of the tank having said partition therein.

3. A water heater partition member in accordance with claim 2 in which each of said partition member removed portions has a generally semi-circular shape.

4. A water heater partition member in accordance with claim 3 in which said flat partition member is made of an insulating material.

5. A water heater partition member in accordance with claim 4 in which said screen has annular angled edges for attaching said screen to said partition member and a flat portion covering said flat partition member central opening.

6. A water heater partition member in accordance with claim 5 in which said partition member has a second aperture therein.

7. A method of making a water heater have a partitioned water tank comprising the following steps:
making a partition for a water tank having a circumference larger than the walls of said water tank, with a central opening and a wedge shaped gap formed therein;
bending said partition member to form a generally truncated cone shape;
inserting said truncated cone shaped partition member in a water heater tank below a heating element in said water tank so that at least a portion of said heating element lies directly above said central opening,
attaching the edge portions of said partition along the wedge shape gap together to form a generally truncated cone shape; and
press fitting the truncated cone shaped partition member into said water heater.

8. A method in accordance with claim 7 including the step of attaching a screen covering the central opening in said truncated cone shape partition.

* * * * *